June 16, 1959 E. W. WORK 2,890,889
COMBINATION POWER AND HAND OPERATED CHUCK
Filed July 16, 1958 2 Sheets-Sheet 1
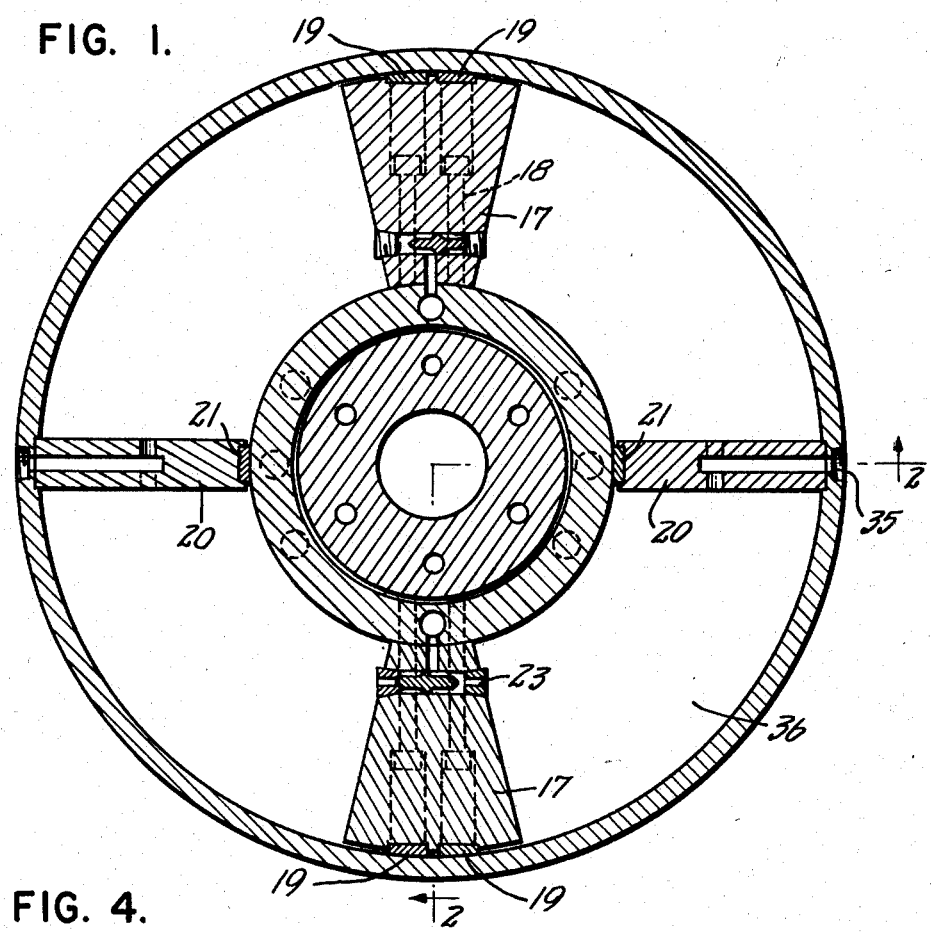
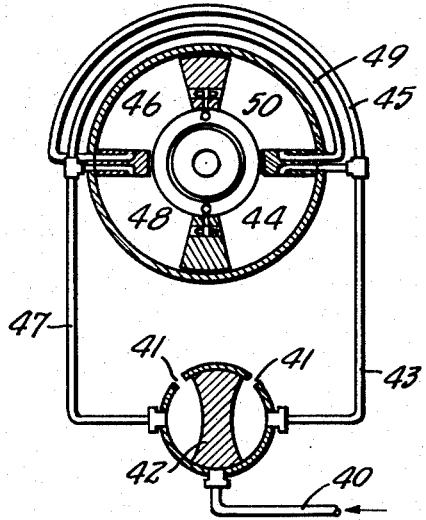
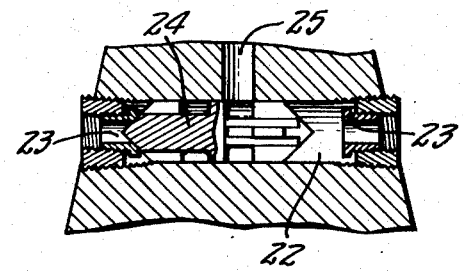
INVENTOR
ERICH W. WORK
BY
ATTORNEYS June 16, 1959   E. W. WORK   2,890,889
COMBINATION POWER AND HAND OPERATED CHUCK
Filed July 16, 1958   2 Sheets-Sheet 2

INVENTOR
ERICH W WORK
BY
Mitchell Berhert
ATTORNEYS

United States Patent Office 2,890,889
Patented June 16, 1959

2,890,889

COMBINATION POWER AND HAND OPERATED CHUCK

Erich W. Work, New Britain, Conn., assignor to Union Manufacturing Company, New Britain, Conn., a corporation of Connecticut Application July 16, 1958, Serial No. 749,025

10 Claims. (Cl. 279—114)

My invention relates to a chuck, and more particularly to a power chuck having a vane motor mounted coaxially therewith for actuating the jaws of the chuck.

It is an object of the invention to provide an improved form of chuck having jaws movable thereon and actuable by a vane motor mounted about the axis of the chuck and cooperable therewith for actuating the jaws thereof.

A more specific object is to provide an improved scroll chuck which may be hand operated and which may be power operated by means of a vane motor fixedly mounted but coaxial with said chuck and having means for connection to an operable part of said chuck for actuating the jaws therein.

Another object is to provide an improved form of chuck and combined vane motor mounted about the axis thereof and directly in rear thereof, said vane motor being preferably fixed and said chuck being rotated relatively thereto.

Still another object is to provide a chuck, preferably a scroll chuck, operable by a vane motor mounted coaxially therewith and directly in rear of said chuck, and being of annular form so as to leave the center of said chuck for passage of bar stock or the like.

Another object is to provide a chuck, preferably a scroll chuck, and a vane motor mounted coaxially therewith and directly rearwardly thereof, together with improved means for coupling the vane motor to a movable part of the chuck for actuating the jaws thereof.

Other objects and various features of novelty and invention will be hereinafter pointed out or will become apparent to those skilled in the art.

In a preferred form of the invention, I provide a chuck, preferably a scroll chuck, having radially movable jaws and a scroll plate rotatable in the body of the chuck. The scroll plate is actuable by means of a vane motor mounted preferably directly in rear of the scroll chuck and mounted coaxially with the chuck and rotatable relatively thereto. The vane motor embodies one or more vanes rotatable about the axis of the chuck, together with drive means for connecting the movable vane with the scroll plate of the chuck so that the latter may be rotated for moving the chuck jaws. The vane motor is fluid pressure operated, preferably by compressed air. In one form the vane motor has a completely circular cylinder having two partitions for dividing the cylinder into two semicircular vane chambers, and in each chamber there is a vane, the vanes being 180° apart. These vanes are preferably secured to a rotatable sleeve forming the inner circular head of the cylinder and the vanes and sleeve carry mechanism which may be in the form of a piston, and controlling means therefor for actuating a part, like a clutch ring, for coacting with clutch teeth on the scroll plate of the chuck. Thus, when the teeth are engaged and the vanes rotated in their cylinder, the scroll plate will be rotated and the jaws will be moved. When the jaws have been moved to the desired location, the fluid pressure is relieved and the clutch teeth are separated after which the chuck may be operated in the usual manner, without relation to the position of the motor parts.

In the drawings, which show for illustrative purposes only a preferred form of the invention:

Fig. 1 is a diametral central sectional view through a vane motor and parts associated therewith;

Fig. 3 is an enlarged detail of a double check valve mounted in the vanes of a vane motor;

Fig. 4 is a more or less diagrammatic or schematic view of the fluid pressure connections to the vane motor.

Figure 2:
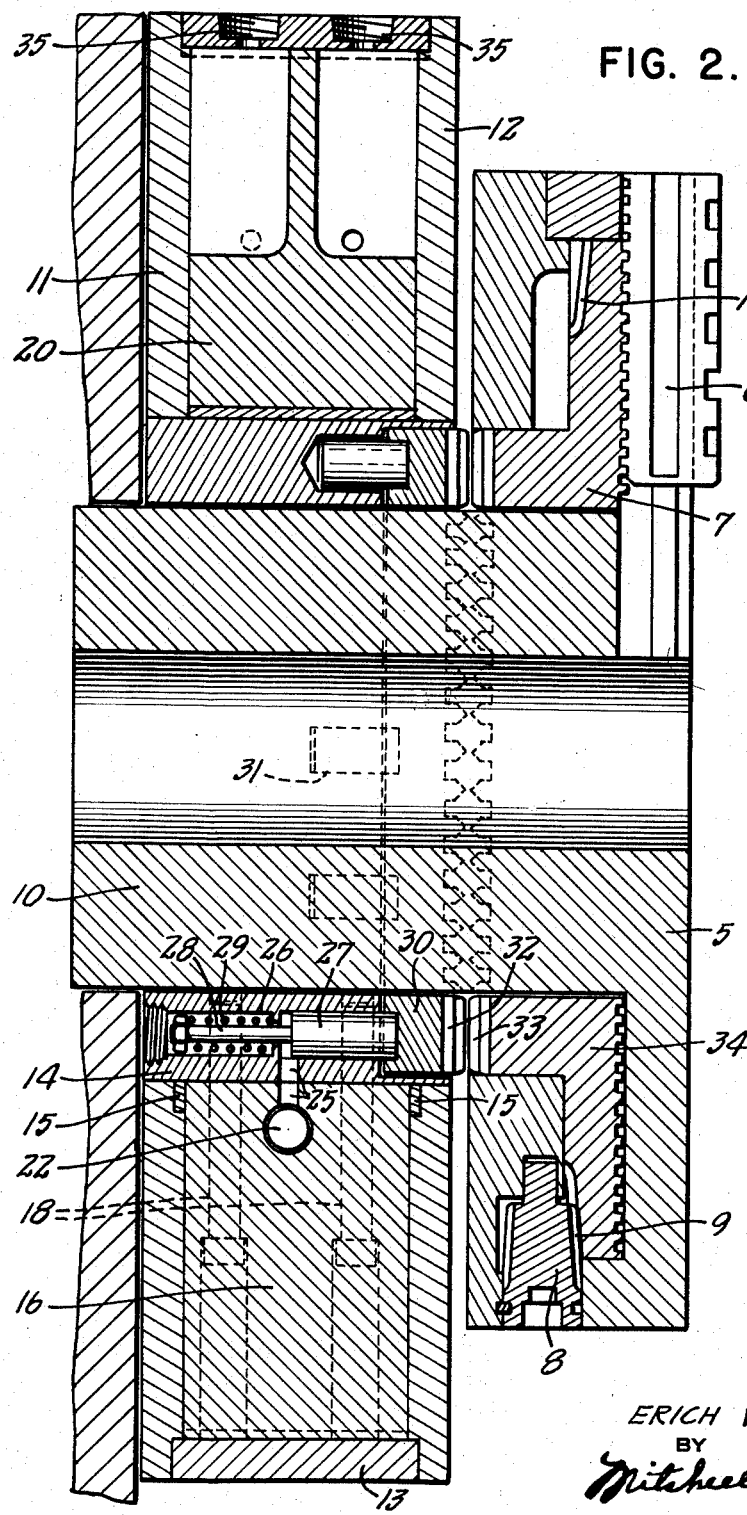
Fig. 2 is a sectional view on an enlarged scale, taken substantially in the plane of the line 2—2 of Fig. 1.

In said drawings, the chuck comprises a chuck body 5 which may be of usual form and includes jaws 6 movable radially thereon in the usual fashion. The jaws are provided with scroll teeth and there is a scroll plate 7 in the chuck body which upon rotation moves the jaws inwardly and outwardly, as will be understood. The body may have a plurality of wrench operated bevel pinions 8 having teeth 9 thereon to engage bevel teeth 10 on the rear of the scroll plate so that upon rotation of the pinions 8 the scroll may be rotated in the usual fashion. The scroll chuck, as thus far described, may be considered as a usual hand operated scroll chuck.

I have provided means for power actuation of the chuck by a vane motor fluid pressure operated. This vane motor is mounted concentrically with the chuck, that is about the same axis as the chuck, and preferably directly in rear thereof. The vane motor is fixed relatively to the body of the machine and the chuck rotates relatively thereto. The arrangement is such that one or more vanes in the vane motor may be connected to and disconnected from the scroll plate of the chuck so that the jaws may be moved in one direction and the connection between the scroll plate and the motor vane is broken after which the chuck may be rotated by the spindle in the usual fashion. As illustrated, the chuck has a rearward sleeve extension 10 to be carried by or bolted directly to the spindle nose, not shown. The rearward sleeve extension 10 forms a bearing about which the vane motor is mounted.

The motor may include the circular cylinder having the end walls 11—12 and a sleeve-like cylinder wall 13 secured to the disc like end walls 11—12. The cylinder, at its axially inner end, is closed by means of an annular sleeve 14 which may rotate relatively to the cylinder and seals such as 15 may be provided so as to maintain a tight joint. This cylinder may have a pair of vanes or vane pistons 16—17, but since such vane pistons are preferably duplicates of each other only one will be described in detail, it being understood that the other piston is preferably a duplicate of the one described. These pistons or vanes are mounted on the sleeve 14 as by means of screws 18 or the like. The piston shown in Fig. 2 is provided with seals 19—19 to form a relatively tight joint with the cylinder itself. These vanes are moved in the cylinder and about the axis of the chuck by means of pressure fluid, preferably compressed air, which enters through suitable passages. In the form shown, these passages are formed in a pair of partitions 20 which are mounted in the cylinder and are fixedly secured to the outer circular cylinder wall and are rotatable relatively to the sleeve 14, seals 21 being provided to maintain a tight joint.

Each vane or piston has a through passage 22 and at each end of this passage there is an inwardly opening valve seat member 23, and within this passage 22 is a double-ended check valve 24. Thus, when air is admitted from say the right hand side (Fig. 3) through the passage 23, the valve 24 is quickly moved over towards the left so as to seal that passage and permit air to enter the traverse passage 25 in the vane and in the sleeve 14. Within the sleeve 14, there is an axial cylinder 26 for housing a piston 27 having a tail 28 with a nut on the end as illustrated. A light coil spring 29 is interposed between the nut and an abutment in the cylinder 26 so as to always urge the piston 27 toward the rear in its cylinder. (As shown in Fig. 2, the piston is in its forward or projected position.) The piston, or pistons when two are employed, are preferably secured to an annular clutch ring 30 which is slidable in the sleeve 14, as will be clear from Fig. 2. Additional guide studs 31 may be employed, if desired, to hold or guide the clutch ring 30 in its back and forth movements with the piston 27. This clutch ring 30 has clutch teeth 32 for coaction with corresponding clutch teeth 33 on the scroll plate or an axial extension 34 thereof. As stated, air may be admitted through the partitions 20 which divide the circular cylinder into two semicircular cylinders and one of the pistons is in each of these semicircular cylinders.

Each cylinder partition 20 may have openings 35 therein which open at opposite sides of the partitions, as shown clearly in Figs. 1 and 2. If pressure fluid, such as compressed air, is admitted through one of the openings 35 so as to enter the right hand side of the chamber 36 (Fig. 1), the fluid will enter the right hand valve passage 23, and the left hand passage will be closed by the check valve (Fig. 4) which has been moved over toward the left. The air or other fluid will then enter the passage 25 behind the piston 27 and such pressure will readily overcome the light spring 28 and move the piston 27 toward the right and carry with it the annular ring 36. This movement of the ring 36 to the right will cause engagement between the teeth 32—33 and therefore lock the vane and the ring 30 to the scroll plate or extension 34 thereof. During this time the friction between the vane and the cylinder will be sufficiently high so that the vane is not moved in the cylinder. However, upon further admission of pressure fluid, the vane will be moved in a clockwise direction (Fig. 1) so as to rotate the scroll plate for actuation of the jaws. If the jaws are closed by this operation, the next operation would be to release the air from behind the vanes and from behind the piston so that the spring 28 will withdraw pistons and thus free the clutch teeth on the scroll plate and the annular clutch ring. Thereafter the chuck may be rotated in the usual fashion with work pieces in the chuck. When it is desired to unchuck the work piece, the spindle is stopped and air is admitted through the opposite partition to the opposite side of the vane so that the chuck valve (Fig. 4) will be moved to the right and the air pressure will again get behind the piston 27 so as to clutch the teeth 32—33 and rotate the scroll plate in the opposite direction so as to open the chuck. When the finished work piece has been removed, the air is released and the clutch teeth freed. When a new work piece is inserted, the chuck will again be closed through the proper partition, as will be clearly understood.

Fig. 4 shows clearly a diagrammatic scheme for admitting fluid pressure to the proper sides of the pistons for operation, as described. In the form shown, the pressure fluid, such as air, enters the four-way valve through the pipe 40. With the valve in the neutral position shown, both sides of the vanes are open to exhaust through the exhaust passages 41—41. As soon as the valve 42 is moved, say in a clockwise direction, compressed air is admitted through the pipe 43 to the chamber 44 and through the connecting pipe 45 to the chamber 46. During this position of the valve the opposite chambers remain open to exhaust. After the vanes have been moved to actuate the chuck jaws, as heretofore described, the valve 42 is again moved back into neutral position, as shown in Fig. 4, which opens the chambers 44—46 again to exhaust and permits declutching of the scroll plate from the motor. When the valve is moved in a counterclockwise direction, compressed air or pressure fluid enters the pipe 47 and from that pipe enters the chamber 48, and through the connecting pipe 49 enters the chamber 50 so as to rotate the vanes and the scroll plate in the opposite direction. During this operation, the chambers 44—46 will be open to exhaust through the exhaust passage 41, as will be understood. Thus, by the shifting of the valve 42 from the neutral position shown, in one direction, it actuates the scroll plate so as to grip the work pieces. Moving the valve 42 back to neutral position opens both sides to exhaust and movement of the valve 42 to the opposite position moves the vanes and the scroll plate in the opposite direction so as to again clutch the clutch parts and move the jaws in the opposite direction.

It will be seen that I have provided an improved form of chuck operated by a vane motor which is mounted directly adjacent to the chuck and which permits free rotation of the chuck after the jaws have been actuated by the vane motor. The vane motor is of an annular form so that the central part of the chuck is left open for bar stock or other parts which may project into or through the chuck. The parts are all simple in construction.

While the invention has been described in considerable detail and a preferred form illustrated, it is to be understood that various changes and modifications may be made within the scope of the invention, as defined in the appended claims.

I claim:

1. In a scroll chuck, a chuck body having a scroll plate for actuating chuck jaws, a vane motor mounted concentric with said chuck and having a vane movable therein about the axis of the chuck, and means for connecting said movable vane with said scroll plate for rotating the same.

2. In a chuck, a chuck body, jaws thereon, a member rotatable about the axis thereof for actuating chuck jaws, a vane motor mounted about the same axis as the chuck, said vane motor having a vane movable therein, and means for connecting said vane and said rotatable member in said chuck for rotating said rotatable member and moving said jaws.

3. In a scroll chuck, a chuck body, jaws thereon, a scroll plate therein, jaws on said body and movable by said scroll plate, a fixedly mounted vane motor on the axis of said chuck, a vane movable in said vane motor, said scroll plate and said vane having coacting clutch teeth, and means for moving said clutch teeth into engagement with each other, whereby upon movement of said vane in said vane motor, said scroll plate will be rotated for moving said jaws.

4. In a chuck, a chuck body, jaws movable thereon, a member rotatable in said body for actuating said jaws, a fixedly mounted vane motor on the axis of said chuck, said chuck and vane motor being rotatable relatively to each other, a vane in said motor, clutch means carried with said vane, said rotatable member in said chuck having coacting clutch teeth, and means for causing coaction of the clutch teeth, whereby upon rotation of said vane in said vane motor said rotatable member in said chuck will be rotated for actuating said jaws.

5. In a scroll chuck, a chuck body, jaws movable thereon, a scroll plate in said chuck body, and rotatable about the axis thereof for moving said jaws, said scroll plate having a cylindrical extension having clutch teeth therein, a fixedly mounted vane motor on the axis of said chuck and rotatable relatively thereto, a vane in said vane motor, means actuated by said vane and having clutch teeth for engagement with the clutch teeth on said scroll plate extension, whereby when the clutch teeth are engaged and the vane in said motor rotated in the housing thereof said scroll plate will be rotated to actuate said jaws.

6. In a chuck, chuck jaws movable thereon, a rotatable member for actuating said jaws, clutch teeth on said member, a vane motor fixedly mounted about the axis of said chuck, said chuck and vane motor being rotatable relatively to each other, an annular ring rotatable in the body of said vane motor, a vane in the body of said vane motor and rigidly secured to said ring, an annular clutch ring having clutch teeth for engagement with the clutch teeth on said rotatable member in said chuck, a fluid pressure actuated means in said ring and acting on said clutch ring for moving the latter to engage the clutch teeth of the two clutches upon the application of fluid pressure to said fluid pressure actuated means.

7. In a chuck, a chuck body, jaws therein, a rotatable member for moving said jaws, a vane motor including an arcuate casing mounted about the axis of said chuck, said chuck and vane motor being rotatable relatively to each other, an annular sleeve in said vane motor cylinder and rotatable therein, a vane secured to said sleeve, whereby upon movement of said vane in said cylinder said sleeve will be rotated, said sleeve having a piston therein, means for introducing pressure fluid to said piston for projecting the latter, an annular clutch ring adjacent the end of said sleeve and cooperable with said piston, whereby upon actuation of the latter said clutch ring will be advanced toward the rotatable member of said chuck, said rotatable member and said annular clutch ring having clutch teeth for cooperation with each other so that upon rotation of said vane and said sleeve said rotatable member in said chuck body will be rotated for actuating said jaws.

8. In a chuck, a chuck body, jaws movable therein, a rotatable member in said body for moving said jaws, a vane motor mounted coaxially with said chuck, said vane motor having an arcuate cylinder, a vane therein, a sleeve concentric with said cylinder, said vane in said cylinder being rigidly secured to said sleeve, a clutch ring adjacent the end of said sleeve and movable axially thereof, a piston movable axially in said sleeve and cooperable with said clutch ring for moving the latter axially of said sleeve, a valve in said vane for admitting pressure fluid to one end of said piston for actuating the same to cause it to move said clutch ring, whereby upon rotation of said vane in said cylinder said piston will carry said clutch ring around the axis of said motor, said clutch ring and said rotatable member in said chuck having cooperable clutch teeth for engagement with each other for the purpose set forth.

9. In a chuck, a chuck body, a vane motor mounted concentrically therewith and including a circular cylinder, a vane in said cylinder and movable therein about the axis of said chuck, a passage through said vane, a check valve in said passage engageable alternately with seats at opposite ends of said passage, whereby upon the admission of pressure fluid to one end of said passage said valve will be moved so as to close the other end of said passage, an annular sleeve concentric with said motor cylinder and rotatable therein, a piston axially mounted in said sleeve and moved in one direction by spring means, a passage from said valve chamber to one end of said piston for moving the latter against the force of said spring, and means controlled by the movement of said piston for connecting said vane and said rotatable member in said chuck body for rotating said rotatable member for actuating said jaws.

10. In a chuck, a chuck body, jaws movable thereon, a scroll plate in said chuck body for actuating said jaws, said scroll plate having a cylindrical sleeve extending rearwardly therefrom, a vane motor for operating said chuck and comprising a circular cylinder mounted about the axis of said chuck, said cylinder and said chuck body being rotatable relatively to each other, a pair of vanes substantially 180° apart in said circular cylinder and movable therein about the axis of said chuck and said cylinder, a pair of partitions in said cylinder about 180° apart, whereby said cylinder is divided into two chambers by said partitions, one of said vanes being in each of said chambers, an annular sleeve in said cylinder, said vanes being rigidly secured thereto, said sleeve being rotatable relatively to said partitions and to said cylinder, an annular clutch ring movable with said sleeve, a piston at the region of said vane and slidable in a bore in said sleeve, an air passage extending through said vane, a double check valve in said passage, said partitions having pressure fluid inlets and outlets therein communicating with opposite sides of said vanes, whereby when pressure fluid is admitted through said partitions to said vanes, said check valves will be actuated to permit air to flow only in one direction through said passages, whereby said pistons in said ring will be actuated, a clutch ring movable with said sleeve and associated with said pistons, whereby upon actuation of said pistons said clutch ring will be projected forwardly, said scroll sleeve having clutch teeth for engagement by the clutch teeth on said clutch ring, whereby upon rotation of said vanes of said circular cylinder said clutch ring will rotate said scroll plate for actuating the jaws in said chuck.

References Cited in the file of this patent
UNITED STATES PATENTS

| | | |
|---|---|---|
| 2,559,842 | Bannister | July 10, 1951 |
| 2,751,230 | Korber | June 19, 1956 |
| 2,781,027 | Henry | Feb. 12, 1957 |